(12) United States Patent
Srivastava

(10) Patent No.: US 9,606,784 B2
(45) Date of Patent: Mar. 28, 2017

(54) DATA OBJECT WITH COMMON SEQUENTIAL STATEMENTS

(71) Applicant: International Business Machines Corporation, Armonk, NY (US)

(72) Inventor: Vaibhav Srivastava, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 14/139,920

(22) Filed: Dec. 24, 2013

(65) Prior Publication Data
US 2015/0178382 A1 Jun. 25, 2015

(51) Int. Cl.
*G06F 9/45* (2006.01)
*G06F 17/30* (2006.01)

(52) U.S. Cl.
CPC ........ *G06F 8/4434* (2013.01); *G06F 17/3071* (2013.01); *G06F 17/30705* (2013.01)

(58) Field of Classification Search
CPC ......... G06F 17/30705; G06F 17/30598; G06F 17/30312
USPC .................. 707/737, 738, 740, 741; 717/115
See application file for complete search history.

(56) References Cited

U.S. PATENT DOCUMENTS

| | | | |
|---|---|---|---|
| 8,239,826 B2 | 8/2012 | Elenburg et al. | |
| 8,370,811 B2 | 2/2013 | Grechanik et al. | |
| 8,473,914 B2 | 6/2013 | Bergman et al. | |
| 8,490,056 B2 | 7/2013 | Lau et al. | |
| 2008/0320462 A1* | 12/2008 | Bergman | G06F 9/45512 717/168 |
| 2010/0153087 A1* | 6/2010 | Kirtkow | G06F 8/30 703/21 |
| 2011/0271255 A1* | 11/2011 | Lau | G06F 11/368 717/124 |
| 2012/0078878 A1* | 3/2012 | De Smet | G06F 17/3046 707/713 |
| 2012/0266253 A1* | 10/2012 | Takenouchi | G06Q 30/02 726/26 |
| 2013/0041900 A1 | 2/2013 | McCoy et al. | |

OTHER PUBLICATIONS

"Finding Duplicate Rows in SQL Server", StackOverflow.com, Posted Jan. 21, 2010. stackoverflow.com/questions/2112618/finding-duplicate-rows-in-sql-server.

(Continued)

*Primary Examiner* — Robert Beausoliel, Jr.
*Assistant Examiner* — Pedro J Santos
(74) *Attorney, Agent, or Firm* — Mark G. Edwards

(57) ABSTRACT

A method for determining a common sequence of statements from one or more sets of ordered statements. A data object is created that has a first group of data entries, which is created from a first sequence of statements of a first set of statements. Each data entry defines a link between a source and destination statement from the first sequence. Data entries created from a second sequence of statements of a second set are added to the first group of data entries. Each data entry from the second sequence defines a link between a source statement and a destination statement from the second sequence. A second group of data entries is created, which is determined from the first group of data entries that have an equivalent source and destination statements. The second group of data entries is stored in a database as the common sequence of statements.

17 Claims, 12 Drawing Sheets

(56) References Cited

OTHER PUBLICATIONS

IBM, "Manual Test Scripts and Statements", IBM Information Center, © Copyright IBM Corporation 2008, 2012. http://pic.dhe.ibm.com/infocenter/clmhelp/v4r0/index.jsp?topic=%2Fcom.ibm.rational.test.qm.doc%2Ftopics%2Fc_testscripts.html.

* cited by examiner

Script S1 405
1. A
2. B
3. C
4. D
5. E
6. F
7. G
8. H

Script S2 410
1. A
2. B
3. C
4. D
5. E
6. G
7. N
8. P

Script S4 415
1. P
2. Q
3. R
4. A
5. S
6. T
7. V

Script S4 420
1. A
2. B
3. C

Script S5 425
1. G
2. H
3. I
4. J
5. K
6. A
7. B
8. C
9. D
10. E
11. F

400

| | Global List | | | | |
|---|---|---|---|---|---|
| | Source | Destination | No. of Steps | No. of Scripts | Script IDs |
| 512 | A | B | 2 | 1 | S1 |
| 514 | B | C | 2 | 1 | S1 |
| 516 | C | D | 2 | 1 | S1 |
| 518 | D | E | 2 | 1 | S1 |
| 520 | E | F | 2 | 1 | S1 |
| 522 | F | G | 2 | 1 | S1 |
| 524 | G | H | 2 | 1 | S1 |

FIG. 5A

| | Global List | | | | |
|---|---|---|---|---|---|
| | Source | Destination | No. of Steps | No. of Scripts | Script IDs |
| 512 | A | B | 2 | 2 | S1,S2 |
| 514 | B | C | 2 | 2 | S1,S2 |
| 516 | C | D | 2 | 2 | S1,S2 |
| 518 | D | E | 2 | 2 | S1,S2 |
| 520 | E | F | 2 | 1 | S1 |
| 522 | F | G | 2 | 1 | S1 |
| 524 | G | H | 2 | 1 | S1 |
| 526 | E | G | 2 | 1 | S2 |
| 528 | G | N | 2 | 1 | S2 |
| 530 | N | P | 2 | 1 | S2 |

FIG. 5B

| | Global List 500 | | | |
|---|---|---|---|---|
| Source | Destination | No. of Steps | No. of Scripts | Script IDs |
| A | B | 2 | 4 | S1, S2, S4, S5 |
| B | C | 2 | 4 | S1, S2, S4, S5 |
| C | D | 2 | 3 | S1, S2, S5 |
| D | E | 2 | 3 | S1, S2, S5 |
| E | F | 2 | 2 | S1, S5 |
| F | G | 2 | 1 | S1 |
| G | H | 2 | 2 | S1, S5 |
| E | G | 2 | 1 | S2 |
| G | N | 2 | 1 | S2 |
| N | P | 2 | 1 | S2 |
| P | Q | 2 | 1 | S3 |
| Q | R | 2 | 1 | S3 |
| R | A | 2 | 1 | S3 |
| H | I | 2 | 1 | S5 |
| I | J | 2 | 1 | S5 |
| J | K | 2 | 1 | S5 |

FIG. 5C

| Global Output G(2) | | | | |
|---|---|---|---|---|
| Source | Destination | No. of Steps | No. of Scripts | Script IDs |
| A | B | 2 | 4 | S1, S2, S4, S5 |
| B | C | 2 | 4 | S1, S2, S4, S5 |
| C | D | 2 | 3 | S1, S2, S5 |
| D | E | 2 | 3 | S1, S2, S5 |
| E | F | 2 | 2 | S1, S5 |
| G | H | 2 | 2 | S1, S5 |

FIG. 6

| Global Output G(3) | | | | |
|---|---|---|---|---|
| Source | Destination | No. of Steps | No. of Scripts | Script IDs |
| A | C | 3 | 4 | S1, S2, S4, S5 |
| B | D | 3 | 3 | S1, S2, S5 |
| C | E | 3 | 3 | S1, S2, S5 |
| D | F | 3 | 3 | S1, S5 |

FIG. 7

| | Global List | | | |
|---|---|---|---|---|
| Source | Destination | No. of Steps | No. of Scripts | Script IDs |
| A | B | 2 | 4 | S1, S2, S4, S5 |
| B | C | 2 | 4 | S1, S2, S4, S5 |
| C | D | 2 | 3 | S1, S2, S5 |
| D | E | 2 | 3 | S1, S2, S5 |
| E | F | 2 | 2 | S1, S5 |
| F | G | 2 | 1 | S1 |
| G | H | 2 | 2 | S1, S5 |
| E | G | 2 | 1 | S2 |
| G | N | 2 | 1 | S2 |
| N | P | 2 | 1 | S2 |
| P | Q | 2 | 1 | S3 |
| Q | R | 2 | 1 | S3 |
| R | A | 2 | 1 | S3 |
| H | I | 2 | 1 | S5 |
| I | J | 2 | 1 | S5 |
| J | K | 2 | 1 | S5 |
| A | C | 3 | 4 | S1, S2, S4, S5 |
| B | D | 3 | 3 | S1, S2, S5 |
| C | E | 3 | 3 | S1, S2, S5 |
| D | F | 3 | 3 | S1, S5 |

FIG. 8

| Global Output G(4) | | | | |
|---|---|---|---|---|
| Source | Destination | No. of Steps | No. of Scripts | Script IDs |
| A | D | 4 | 3 | S1, S2, S5 |
| B | E | 4 | 3 | S1, S2, S5 |
| C | F | 4 | 2 | S1, S5 |

FIG. 9

| Global Output G(5) | | | | |
|---|---|---|---|---|
| Source | Destination | No. of Steps | No. of Scripts | Script IDs |
| A | E | 5 | 3 | S1, S2, S5 |
| B | F | 5 | 2 | S1, S5 |

FIG. 10

| Global Output G(6) | | | | |
|---|---|---|---|---|
| Source | Destination | No. of Steps | No. of Scripts | Script IDs |
| A | F | 6 | 2 | S1, S5 |

FIG. 11

| Global List | | | | |
|---|---|---|---|---|
| Source | Destination | No. of Steps | No. of Scripts | Script IDs |
| A | B | 2 | 4 | S1, S2, S4, S5 |
| B | C | 2 | 4 | S1, S2, S4, S5 |
| C | D | 2 | 3 | S1, S2, S5 |
| D | E | 2 | 3 | S1, S2, S5 |
| E | F | 2 | 2 | S1, S5 |
| F | G | 2 | 1 | S1 |
| G | H | 2 | 2 | S1, S5 |
| E | G | 2 | 1 | S2 |
| G | N | 2 | 1 | S2 |
| N | P | 2 | 1 | S2 |
| P | Q | 2 | 1 | S3 |
| Q | R | 2 | 1 | S3 |
| R | A | 2 | 1 | S3 |
| H | I | 2 | 1 | S5 |
| I | J | 2 | 1 | S5 |
| J | K | 2 | 1 | S5 |
| A | C | 3 | 4 | S1, S2, S4, S5 |
| B | D | 3 | 3 | S1, S2, S5 |
| C | E | 3 | 3 | S1, S2, S5 |
| D | F | 3 | 3 | S1, S5 |
| A | D | 4 | 3 | S1, S2, S5 |
| B | E | 4 | 3 | S1, S2, S5 |
| C | F | 4 | 2 | S1, S5 |
| A | E | 5 | 3 | S1, S2, S5 |
| B | F | 5 | 2 | S1, S5 |
| A | F | 6 | 2 | S1, S5 |

FIG. 12

DATA OBJECT WITH COMMON SEQUENTIAL STATEMENTS

BACKGROUND

This disclosure relates generally to ordered sets of operation statements in a system, more particular to finding common sequences of statements from the sets.

Computer applications generally contain many lines of code creating instructions or statements to perform a function of the computer application. Each sequence of statements may be contained in a set, such as a file or script, which when combined with other sets make up the computer application. Many statements repeat themselves throughout the sets. For instance, software testers often create test scripts to test different functions of an application under test. A test script generally includes statements such as a step-by-step process to invoke specific functions of the application and verify that the functions correctly perform the intended tasks. For example, test scripts for a Web application being tested may include a common sequence of steps for logging on to a Web site that include entering an ID and a password, and clicking on a "Login" button. Software testers may label such subroutines of steps with keywords to uniquely identify them and facilitate the maintenance of the test scripts.

SUMMARY

Various embodiments are directed to a computer implemented method for determining a common sequence of statements from one or more sets of ordered statements. A data object is created that has a first group of data entries. The first group of data entries is created from a first sequence of statements of a first set of statements. Each data entry defines a link between a source statement and a destination statement from the first sequence of statements. Data entries created from a second sequence of statements of a second set of statements are added to the first group of data entries. Each data entry from the second sequence of statements defines a link between a source statement and a destination statement from the second sequence of statements. A second group of data entries is created. The second group of data entries is determined from the first group of data entries that have an equivalent source statement and an equivalent destination statement. The second group of data entries is stored in a database as the common sequence of statements.

In other embodiments, a computer system and a computer program product are configured to perform the method described above.

BRIEF DESCRIPTION OF THE DRAWINGS

FIGS. 5A-5C illustrate a data object being compiled from a plurality of statements belonging to a plurality of sets of statements, according to various embodiments.

FIG. 6 illustrates linked sequences of statements from the initial data object that appear in multiple sets of statements, according to various embodiments.

FIG. 7 illustrates linked sequences of at least three statements that occur over multiple sets, according to various embodiments.

FIG. 8 illustrates the data object when the linked sequences of three statements from FIG. 7 are added, according to various embodiments.

FIG. 9 illustrates linked sequences of at least four statements that occur over multiple sets, according to various embodiments.

FIG. 10 illustrates linked sequences of at least five statements that occur over multiple sets, according to various embodiments.

FIG. 11 illustrates linked sequences of at least six statements that occur over multiple sets, according to various embodiments.

FIG. 12 illustrates the data object with the smallest common sequence of order statements to the largest common sequence of ordered statements, according to various embodiments.

In the Figures and the Detailed Description, like numbers refer to like elements.

DETAILED DESCRIPTION

Figure 1:
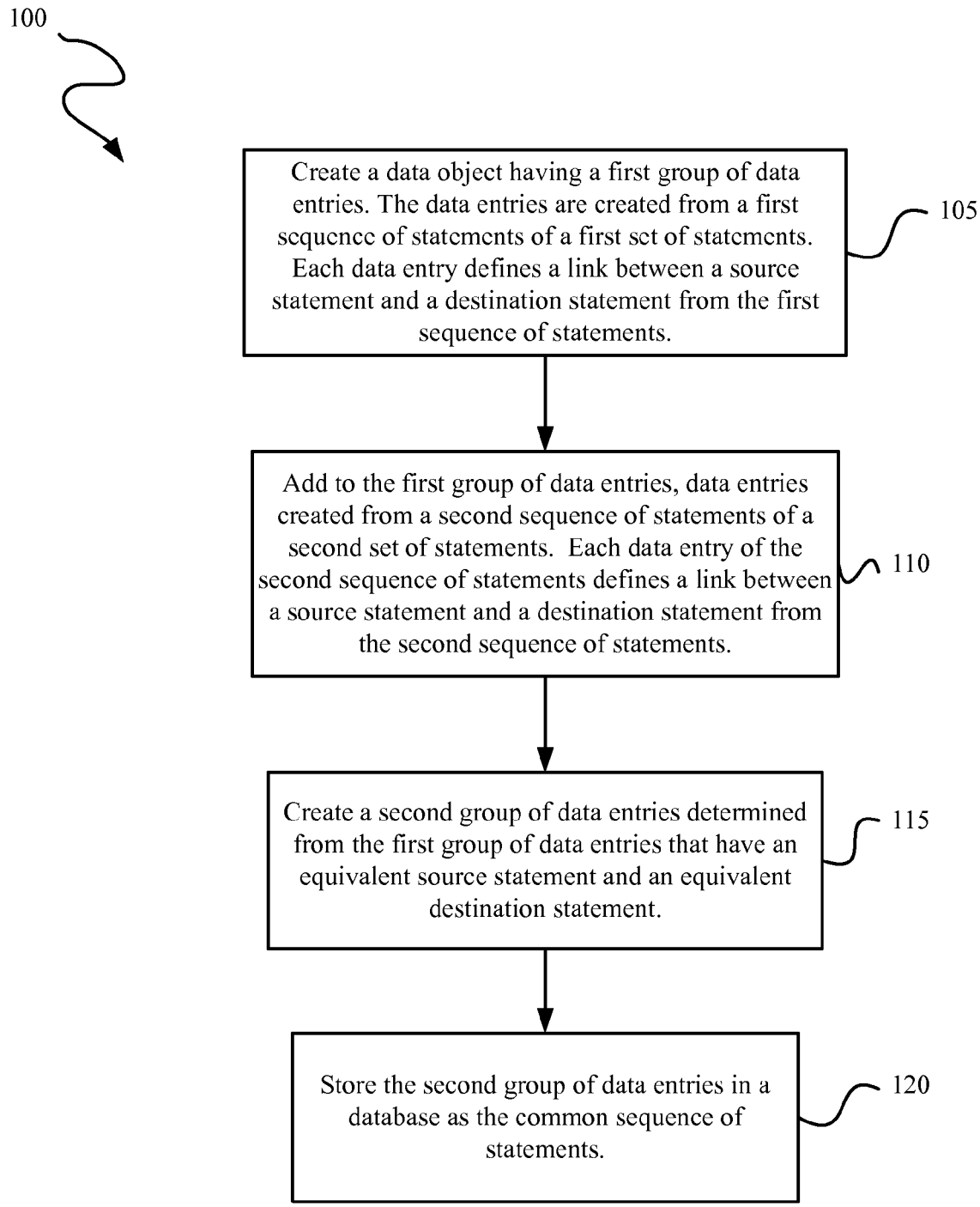
FIG. 1 illustrates a flow diagram of a method of determining a common sequence of statements from one or more sets of statements, according to various embodiments.

Aspects of the present disclosure relate to finding common sequences of statements from sets of statements and creating a data object with the common sequences of statements. Features illustrated in the drawings are not necessarily drawn to scale. Descriptions of well-known components and processing techniques are omitted so as to not unnecessarily obscure the disclosed embodiments. The descriptions of embodiments are provided by way of example only, and are not intended to limit the scope of this present disclosure to such applications.

Various aspects of the present disclosure may relate to software applications and more specifically to test scripts for testing software applications. Software can include instructions, also referred to as statements herein, written with computer code. These statements may exist in different sets of statements. The sets may be data objects such as files and scripts. These sets may make up the software application. Software applications may also be tested with other software applications. When testing a software application many different sets of ordered statements may be created to test the software application. These different sets may be referred to as test scripts and each statement within a test script may be a test step. The statements in a set may be linked so that they follow the order of a test or operation. There may be thousands of test scripts for a given system that may be used to test different applications. A same or similar sequence of steps within a test script may be used in other test scripts within the system. Determining the common sequences of steps and moving the common sequences of steps to a database of common sequences of steps may allow for reusability of common steps and maintenance of the steps across test scripts in the system. Each common sequence may be identified by a keyword.

Embodiments herein provide for finding, from a plurality of statements belonging to a plurality of sets of statements, common sequences of statements within the sets of statements. A global data object may be formed. The global data object may include a plurality of data entries. The data entries may include a link of statements within a set. The link may be a source statement and a destination statement. For instance if a first set had statements A, B, and C. The data entries would have a source statement A and a destination statement B in a first data entry and source statement B and destination statement C in a second data entry. The source statements define where a sequence of statements begins and the destination statements define where the sequence of statements ends. Each entry in the global list may be a statement as a source and the immediately following statement in the sequence.

The global list may add statements from a second set of statements superimposed over the first set of statements. Linked statements that are the same between the two sets may overlap. For instance if the second set had statements A, B, C, and D, source statement A and destination statement B of the second set match the first entry created by the first set of statements. The data entry having the same linked statements may have an indication that two sets share the common sequence. The overlapped statements may provide for the shortest common sequence of statements with two common statements in sequence. Additional sets of statements may be added to the global list. From the linked statements of two common statements, data entries with three common statements may be determined to be shared between two or more sets. Increasingly larger common sequences of statements may be determined until the number of sets that contain the common sequence is less than two. A data object with re-usable keywords may be created from these common sequences of statements. The keywords may be used to create new sets of statements and may be used for modifying existing sets of statements for example.

FIG. 1 illustrates a flow diagram of a method 100 of determining a common sequence of statements from one or more sets of ordered statements, according to various embodiments. In operation 105, a set manager may create a data object having a first group of data entries. The set manager may be a module that manages the sets of statements and performs the operations herein for finding common sequences of statements. The data entries may be created from a first sequence of statements of a first set of statements. The data object may contain various data entries for each statement and each data entry may include data points such as a source statement and a destination statement to identify a link of the ordered statements of the first set. In operation 110, the set manger may add to the first group of data entries, data entries created from a second sequence of statements from a second set of statements. Each data entry from the second sequence of statements defines a link between a source statement and a destination statement from the second sequence of statements. The set manager may continue to add data entries to the first group of linked statements from other sets of statements to the data entries in the data object. The data entries that are equivalent from the first sequence of statements, the second sequence of statements, and additional sequences of statements may be superimposed on each other.

In operation 115, the set manager may create a second group of data entries determined from the first group of data entries that have an equivalent source statement and an equivalent destination statement between the first set and the second set. Having an equivalent source statement and destination statement may show that there is a common sequence of steps between the two sets. For instance, the first set and the second set may have a source statement A and destination statement B. Since the data entry with source statement A and destination B is in two sets, the set manager may place that data entry in the second group.

In operation 120, the set manager may store the second group of data entries in a database as a common sequence of statements. The common sequence of statements may be identified by a keyword. In applications such as steps in test scripts, method 100 may be used to create a database of a common sequence of steps used among test scripts in a particular system. This may allow for reusability of the steps across test scripts without modifying individual test scripts or creating test scripts from scratch.

Figure 2:
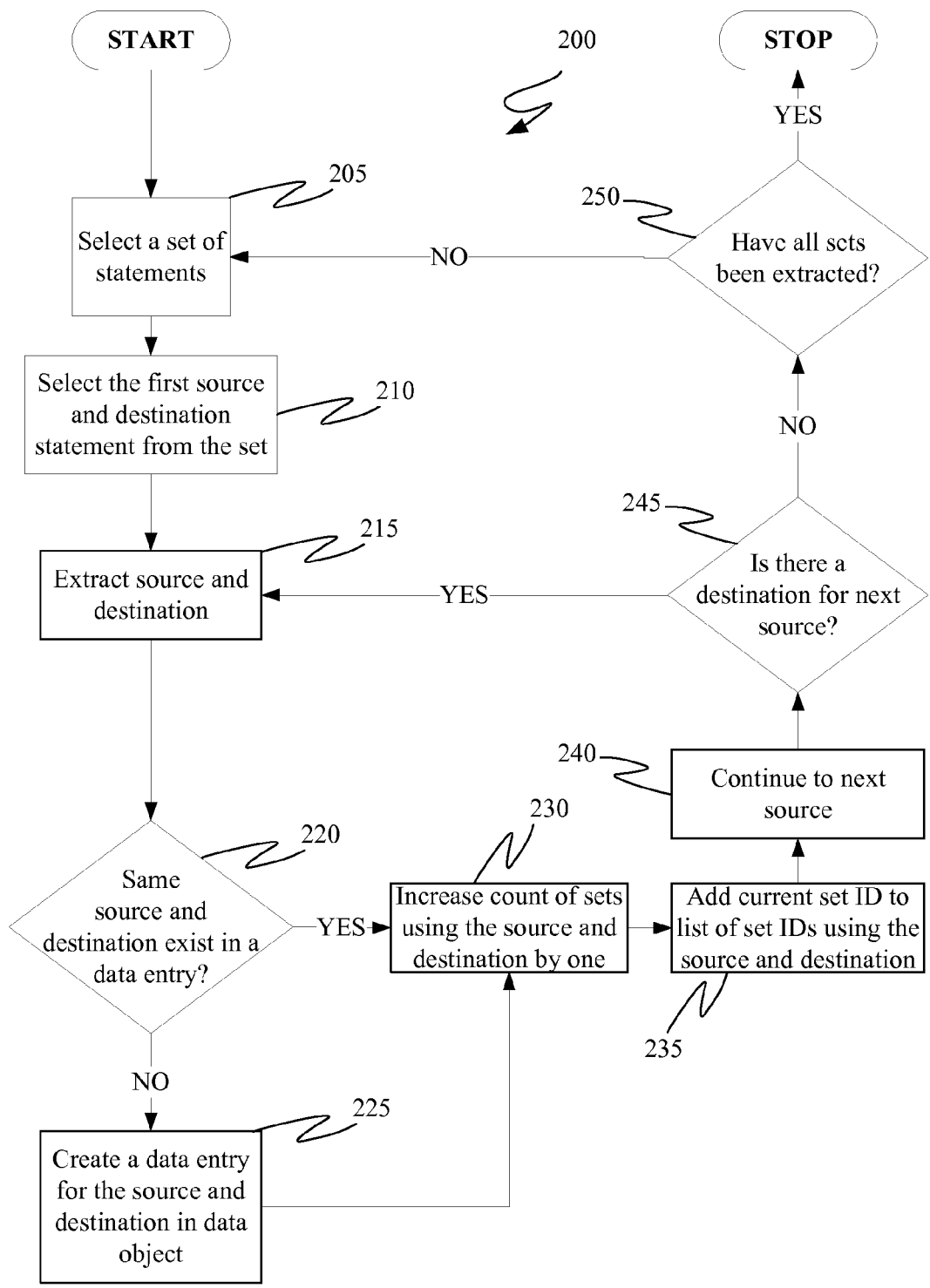
FIG. 2 illustrates a flow diagram of building a data object of a plurality of statements from a plurality of sets, according to various embodiments.

FIG. 2 illustrates a flow diagram of a method 200 for building a data object of a plurality of statements from a plurality of sets of ordered statements, according to various embodiments. The data object may be used to create a database having common sequences of statements between sets. In operation 205, a set of statements may be selected from a system with multiple sets of ordered statements by the set manager. In operation 210, the first statement of the set may be selected as the source statement and the statement immediately following the source statement in the set may be the destination statement. In operation 215, information about the source and destination statements may be extracted from the set. Information such as a set identifier which identifies the script of source and destination statements, the source statement plain language, the destination statement plain language, and the number of statements between the source and destination statements may be ascertained by the set manager. The number of statements between the source statement and destination statement may include the source and destination statements. For example, if the source statement is A and the destination statement is B, then the number of statements between the source and destination statements may be two.

In operation 220, the set manager may determine whether the linked source and destination statements are equivalent to any other data entries with a source statement and destination statement in the data object. If the source and destination statements do not match any other data entries, then in operation 225, a new data entry may be created in the data object with the current linked source and destination statements. The data entry may contain a data point with the number of sets that include the specific source and destination. In operation 230, the count of the data point that includes the set count may be increased by one. Likewise, if in operation 220 equivalent linked sources and destinations exist in the data object, then, in operation 230, the set count may increase by one for the data entry containing the equivalent source and destination statements. In operation 235, each set may have a set identifier. The set identifier of the current set may be added to a data point in the data entry for the set identifiers containing the current source and destination statement.

In operation 240, the method 200 may continue with the set manager selecting the next source statement within the current set of statements. The next source may be the destination of the previous source. In operation 245, the set manager may determine whether there is a destination to the source statement or not, which may be a statement following the new source statement. If there is a destination, then the set manager may return to operation 215. If there is not a destination for the new source, then the set manager may determine whether any sets have not had their statements extracted in operation 250. If in operation 250 all of the sets have had their statements extracted, then the method 200 may continue with operation 205 by selecting a set of statements from the system that has not had statements extracted. If in operation 250 all of the sets have been extracted, then the method 200 may stop.

In various embodiments method 200 may represent the operation 105 and operation 110 of method 100 in FIG. 1. In various embodiments, not all sets in a system may be used to determine common sequences of statements. In other various embodiments, not all statements in the sets may be selected and used for determining the common sequences of statements across sets of statements.

Figure 3A:
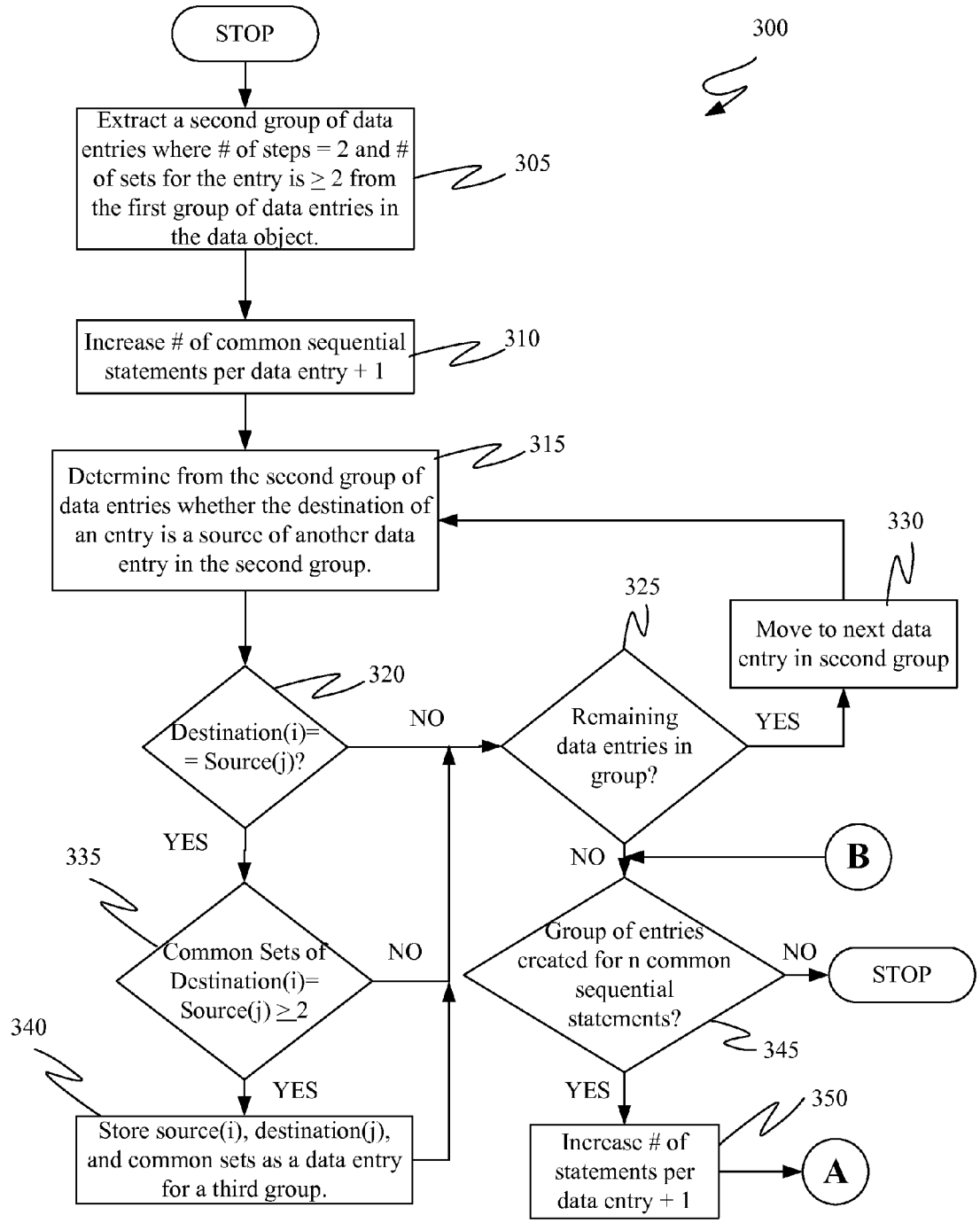
FIGS. 3A and 3B illustrate a flow diagram of determining the smallest common sequence of statements to the largest common sequence of statements from the data object formed in FIG. 2, according to various embodiments.

FIG. 3A illustrates a flow diagram of a method 300 for determining the smallest common sequence of statements to the largest common sequence of statements from the data object formed in FIG. 2, according to various embodiments. In operation 305, the set manager may extract data entries of the data object formed in FIG. 2. The data entries extracted may be data entries where the number of common sequential statements between a source statement and a destination statement are two including the source and the destination. Also, a condition for the data entries to be extracted may be when two or more sets contain an equivalent source statement and destination statement. This group of extracted data entries may be a second group of data entries where the data object formed in FIG. 2 may be a first group of data entries. The second group of data entries may be added to a database, the data object or a new data object. The extracted data entries are the smallest most common sequence of statements from the sets with two common sequential statements.

The set manager may then find a third group of sequential statements, common between a plurality of sets where there are three common sequential statements per entry. This may be done by increasing the number of sequential statements between the source and destination in a data entry by one as in operation 310. In operation 315, the set manager may determine from the second group of data entries whether the destination of a data entry from the second group is equivalent to the source of another data entry in the second group. In operation 320, if the destination statement of a data entry is not equivalent to the source statement of another entry in the second group, then in operation 325 it may be determined whether there are any remaining data entries in the second group whose destination has not been checked with other sources within the second group. If there are remaining entries, then the method 300 may continue to operation 330. In operation 330, the set manager may move to the next data entry in the second group and the method may continue back to operation 315.

Returning to operation 320, if the destination statement of a data entry is equivalent to the source statement of another data entry, which may be referred to as first data entry and second data entry respectively, within the second group, then the set manager may determine whether the number of sets that are common in the first data entry and the second data entry number is at least two, in operation 335. If in operation 335 the number sets that are common between the two data entries is at least two, then, in operation 340, the source statement of the first data entry, the destination of the second data entry, and the common sets between the two data entries may be stored as a data entry in a third group within a database, the data object, or a new data object, for example. The method 300 may continue with operation 325. If the number of common sets in operation 335 is less than 2, then the method 300 may continue with operation 325.

If in operation 325, all of the data entries of the third group have been checked, then the method may continue to operation 345. In operation 345, the set manager may determine whether a third group of entries was created. If there were no data entries created, then that may indicate that two common sequential statements is the largest common sequence of statements and the method 300 would stop. If in operation 345 a group of data entries was created, then method 300 may continue to operation 350. In operation 350, the number of common sequential statements per data entry may be increased by one and the method 300 may continue to operation 355 in FIG. 3B.

Figure 3B:
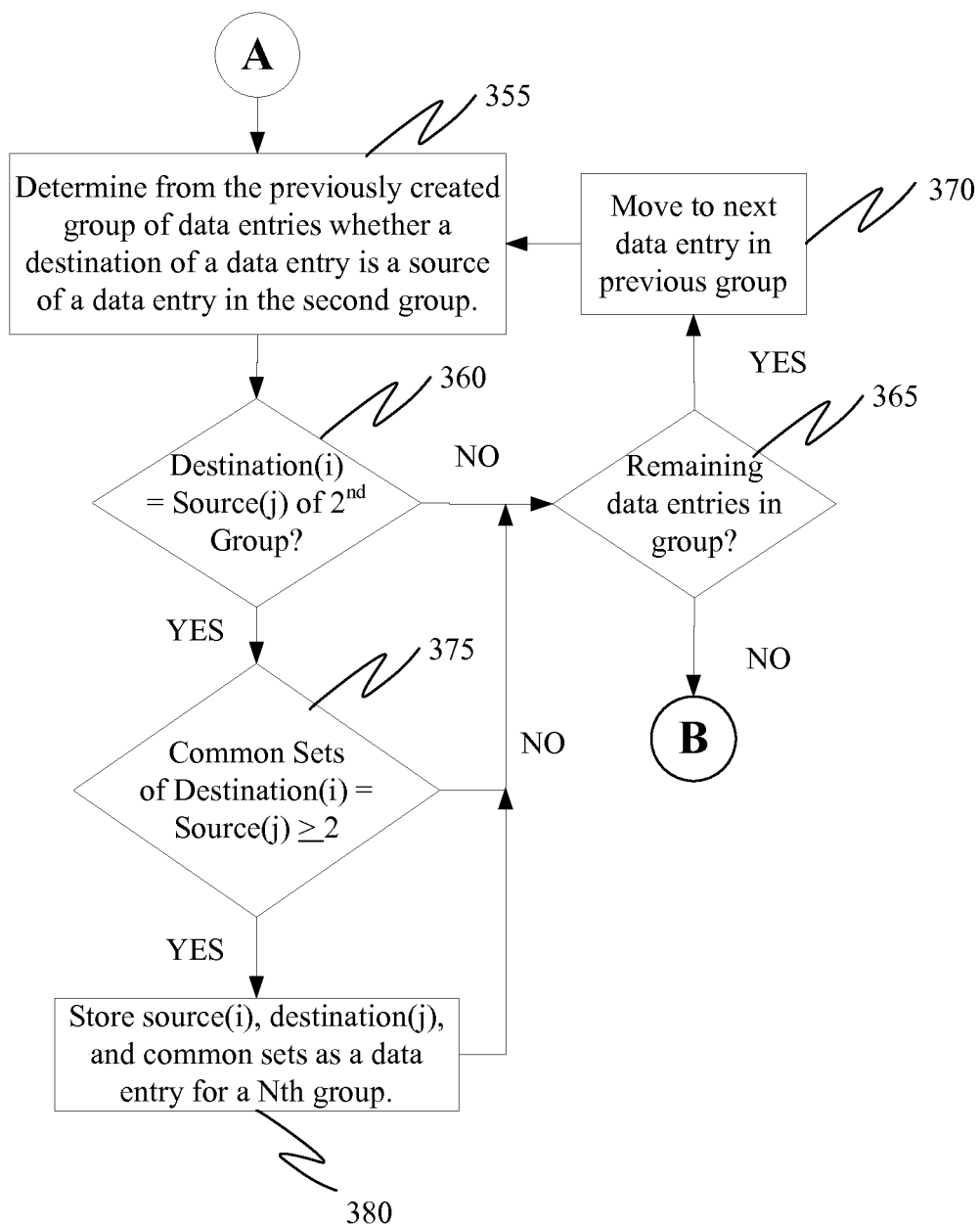

FIG. 3B illustrates a flow diagram of the method 300 that began in FIG. 3A, according to various embodiments. In operation 355, the set manager may determine whether a destination statement of a data entry from the previously created group of data entries is equivalent to a source statement of a data entry in the second group. For example, since the previous group was the third group, a destination statement from a data entry in the third group may be compared to source statements in the second group to determine if any are equivalent. In operation 360, if the destination statement of a data entry from the previously created group is not equivalent to a source statement of a data entry in the second group, then the method 300 may continue to operation 365. In operation 365, if the there are any remaining data entries in the previously created group whose destination statement has not been checked with a source statement from the second group, then in operation 370, the set manager may move to the next data entry in the previously created group. The method 300 may return to operation 355.

Returning to operation 360, if the destination statement of the selected data entry of the previously created group is equivalent to a source statement of a data entry in the second group, then, in operation 375, the set manager may determine whether there are two or more sets that are common between the selected data entry containing the destination statement and the data entry from the second group containing the equivalent source statement. If there are not two or more common sets between the two data entries, the method 300 may continue to operation 365. If there are two or more common sets, then, in operation 380, the set manager may store in a new data entry the source statement of the data entry from the previously created group having a destination statement equivalent to the source statement of a data entry in the second group. The destination statement of the data entry in the second group where the source statement is equivalent to the destination statement of the data entry of the previously created group may also be stored in the new data entry. Also, an identifier for the common sets between the data entries may be stored in the new data entry for an nth group. The method 300 may return to operation 365. If in operation 365 there are no more data entries from the previously created group, then method 300 may continue to operation 345 of FIG. 3A. Here the method 300 may end if there was not a new group of data entries formed from the previously created group. Method 300 may store increasingly larger common sequential statements in a database or the data object. Each common sequence of statements may be identified with a keyword and may be used to create new sets of statements and to modify existing sets of statements.

Figure 4:
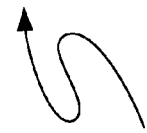
FIG. 4 illustrates example sets of statements, according to various embodiments.

FIG. 4 illustrates example sets of ordered statements in a system that may be used to illustrate an example of the methods above, according to various embodiments. In this example the sets may be test scripts. Each test script may have a plurality of ordered steps. The steps may be the statements. A first script 405 with a set identifier S1 (also may be referred to herein as a script identifier S1 for the example) may contain a sequence of steps to perform. The steps are shown as letters for simplicity of the example. The first script may contain a sequence of steps A, B, C, D, E, F, G, and H. A second script 410 with script identifier S2 may contain the sequence of steps A, B, C, D, E, G, N, and P. A third script 415 with a script identifier S3 may contain the sequence of steps P, Q, R, A, S, T, and V. A fourth script 420 with a script identifier S4 may contain a sequence of steps A, B, and C. A fifth script 425 with a script identifier S5 may contain a sequence of steps G, H, I, J, K, A, B, C, D, E, and F. The like letters between test scripts may be equivalent steps. The plain text of the equivalent may be a 100% match, based on hash values of the steps, normalized plain test or a combination factors that may make steps equivalent. As shown, equivalent steps do not necessarily have to be at the same position within the script. For example, step A could be the sixth step in S5 and it could be the first step as in S1 and still be equivalent. In various embodiments, when each test script ends it cannot follow up to the next script. The scripts are individual entities.

FIGS. 5A-5C illustrate a data object being compiled from a plurality of statements belonging to a plurality of sets of statements, according to various embodiments. The example data object 500 in FIGS. 5A-5C includes the steps from the test scripts from FIG. 4. The data object may be an example of the data object being created in operations 105 and 110 of method 100 of FIG. 1 and the method 200 in FIG. 2. In the example the data object is illustrated as a table, however other types of data objects may be used such as a forest graph or other data objects that may be organized.

FIG. 5A illustrates the data object 500 after the first script 405 of FIG. 4 is added to the data object 500. The data object 500 may also be referred to as the global list 500 herein. The global list 500 may contain a plurality of steps from a plurality of test scripts according to various embodiments. The global list 500 may have columns for a source statement (step) 502, a destination statement (step) 504, a number of statements (steps) 506 between the source statement and destination statement inclusive of the source and destination statements, the number of common sets (scripts) 508 that contain the specific link of source and destination, and the set identifiers (script IDs) 510 that identifies the scripts that contain the linked source and destination statements. The source step 502 is a step in the test script. The destination step 504 is linked sequential step from the source step. In the instance of the global list 500 for FIG. 5, the destination step is the step immediately following the source step since the number of steps 506 is two. The source step and destination steps may be linked.

In various embodiments, global list 500 may include the steps of script S1. Each row of the global list 500 may be a data entry. The data entry may be a link of steps in the script S1. Row 512 may include a data entry for source step A and destination step B. Row 514 may include a data entry for source step B and destination step C. Row 516 may include a data entry for source step C and destination step D. Row 518 may include a data entry for source step D and destination step E and so forth until there are no destination steps remaining in row 524 where a data entry may include source step G and destination step H. There is no other data entry as a destination step for the source step H because that is where the steps of script S1 end.

FIG. 5B illustrates the global list 500 after script S2 is added to the global list 500, according to various embodiments. The data entries of source steps and destination steps from script S2 are added to the source/destination step data entries of script S1. When data entries from script S1 and script S2 have equivalent data entries of an equivalent source step and equivalent destination step, the number of scripts in column 508 may be increased in the rows of common equivalent linked steps and the script ID of the equivalent data entry may be included in column 510. This can be seen in rows 512-518. Script S2 has the same data entries as script S1 in these rows. Script S2 also has different data entries that are added to the global list 500 in rows 526, 528, and 530.

The process of extracting linked steps from scripts may continue until all of the steps from all of the scripts have been extracted. FIG. 5C shows the global list after all of the source steps with a destination step have been extracted from scripts S1, S2, S3, S4, and S5 of FIG. 4. Rows 532-542 are added as new data entries as a result of extracting scripts S3, S4, and S5. Rows 512, 514, 516, 518, 520, and 524 all have a plurality of common scripts that contain equivalent linked source steps and destination steps from various test scripts. The global list 500 may also be referred to as the first group herein.

FIG. 6 illustrates linked sequences of statements from the data object that appear in multiple sets of statements, according to various embodiments. In the example of test scripts being the sets, a second global output G(2) 600 (as also referred to as the second group 600 herein) may include the data entries from the global list 500 where the data entries have more than one common test script. A set manager may extract the rows identified in the global list 500 of FIG. 5C that contain more than one script identifier such as data entries in rows 512, 514, 516, 518, 520, and 524. The second group 600 may include the columns source steps 602, destination steps 604, number of steps 606 between the source step and destination step which is two for the second group, the number of scripts 608 containing the equivalent linked source step and destination step, and the script IDs 610. The data entry in row 612 may contain the link of source step A and destination step B which can be found in scripts S1, S2, S4, and S5. The data entry in row 614 may contain the link of source step B and destination step C, which can be found in scripts S1, S2, S4, and S5. The data entry in row 616 may contain the link of source step C and destination step D, which can be found in scripts S1, S2, and S5. The data entry in row 618 may contain the link of source step D and destination step E, which can be found in scripts S1, S2, and S5. The data entry in row 620 may contain the link of source step E and destination step F, which can be found in scripts S1 and S5. The data entry in row 622 may contain the link of source step G and destination step H, which can be found in scripts S1 and S5.

FIG. 7 illustrates a third group of data entries with three common sequential statements that occur over multiple sets, according to various embodiments. FIG. 7 may illustrate a third global output G(3) 700 also referred to as a third group 700. The third group 700 may have data entries with three common linked sequential steps in two or more test scripts. Like the second group 600 and first group 500, the third group 700 may include a source step 702, destination step 704, number of steps 706 (which is now three), the number of scripts 708, and the script IDs 710.

The third group 700 may be determined by the set manager. The set manager may compare the destination step of each data entry in the second group to the source steps of other data entries within the second group. When comparing, the set manager may determine whether the destination step is equivalent to a source step. When the destination step of a first data entry is equivalent to the source step of a second data entry and both of the first and second data entries share at least two common scripts, then a data entry in the third group may be created. The data entry in the third group may contain the source step of the first data entry. The destination step of the data entry in the third group may be the destination step of the second data entry. The data entry in the third group may also include the common scripts between the first and second data entries of the second group.

In the example illustrated between FIG. 6 and FIG. 7, the set manger may look at the destination step of the data entry in row 612 which is B. The set manger may then compare the destination step B to source steps of other data entries in table 600 to determine whether destination step B is equivalent to a source step. Since the data entry in row 614 has a source step B, source step B is equivalent to the destination step B. The set manager may also compare whether the two data entries in rows 612 and 614 share at least two common scripts. Since, both data entries are in script S1, script S2, script S4, and script S5, the condition may be satisfied.

Since the conditions are satisfied, the set manager may then create a data entry in the third group in FIG. 7. The data entry may be in row 712. The data entry in the third group in row 712 may contain the source statement of the data entry in row 612 of the second group 600 and the destination statement of the data entry in row 614 of the second group 600. This data entry creates a common sequence of steps that is three steps long. The common sequence of steps may be source step A, step B, and destination step C.

The data entry in row 714 may be created from rows 614 and 616 because row 614 of the second group 600 has an equivalent destination step C to that of the source step C of row 616. The common scripts in row 714 may be S1, S2, and S5. The data entry in row 716 may be created from rows 616 and 618 because row 616 of the second group 600 has an equivalent destination step D to that of the source step D of row 618. The common scripts in row 716 may be S1, S2, and S5. The data entry in row 718 may be created from rows 618 and 620 because row 618 of the second group 600 has an equivalent destination step E to that of the source step E of row 620. The common scripts in row 714 may be S1 and S5.

FIG. 8 illustrates the data object 500 of FIG. 5C when the data entries of the third group 700 are added to the data object, according to various embodiments. In various embodiments, the third group may be added to the data object of the first group, (global list table 500 now referred to as global list table 800). The third group is illustrated as rows 844, 846, 848, and 850. According to other various embodiments, the third group may be its own separate data object or part of a keyword database, each data entry being a common sequence of statements.

FIG. 9 illustrates an example of at least one common sequence of statements at least four statements long that occur in multiple sets, according to various embodiments. FIG. 9 illustrates a fourth group 900 of statements that have data entries of four sequential steps in two or more scripts. The fourth group 900 of common sequential steps may be determined by the set manager comparing a destination step of the third group 700 of FIG. 7 with a source step of the second group 600 of FIG. 6 to determine whether they are equivalent. If the destination step of the third group 700 data entry is equivalent to a source step of a second group 600 data entry, the set manager may determine whether the two data entries share two or more common test scripts. If both conditions are satisfied, then a data entry may be created in the forth group 900. The data entry may include the source statement of the third group data entry and the destination statement of the second group data entry. The set manager may also identify the common test scripts that contain the four steps between and including the source and destination in the fourth group.

In the example illustrated between FIG. 6, FIG. 7, and FIG. 9, the set manger may look at the destination step of the data entry in row 712 of the third group 700 in FIG. 7 which is step C. The set manger may then compare the destination step C to source steps of data entries in the second group 600 of FIG. 6 to determine whether destination C matches a source step of one of the data entries in the second group. Since the data entry in row 616 has an equivalent source step C to the destination step C, there is a match. The set manager may also compare whether the two data entries in rows 712 and 616 share at least two common scripts. Since, both data entries are in test script S1, test script S2, and test script S5, the condition may be satisfied.

Since the conditions are satisfied, the set manager may then create a data entry in the fourth group 900 in FIG. 9. The data entry may be in row 912. The data entry in the fourth group in row 912 may contain the source statement of the data entry in row 712 and the destination statement of the data entry in row 616. This data entry creates a common sequence of steps that is four steps long.

The data entry in row 914 may be created from rows 714 and 618 because row 714 of the third group of steps 700 has an equivalent destination step D to that of the source step D of row 618 in the second group 600 of steps. The data entry in row 916 may be created from rows 716 and 620 because row 716 of the third group 700 of steps has an equivalent destination step E to that of the source step E of row 620 of the second group 600 of steps.

FIG. 10 illustrates linked sequences of at least five statements that occur over multiple sets, according to various embodiments. FIG. 10 illustrates a fifth group 1000 of steps that have data entries of five sequential steps in two or more test scripts. The fifth group of sequential steps may be determined by the set manager comparing a destination step of a data entry of the fourth group 900 of FIG. 9 with a source step of the second group 600 of FIG. 6 to determine whether they are equivalent. If the destination step of the fourth group 900 data entry is equivalent to a source step of a second group 600 data entry, the set manager may determine whether the two data entries share two or more common test scripts. If both conditions exist, then a data entry may be created in the fifth group 1000. The data entry may include the source step of the fourth group data entry and the destination step of the second group data entry. The set manager may also identify the common test scripts that contain the five steps between and including the source step and destination step in the fifth group 1000.

In the example illustrated between FIG. 6, FIG. 9, and FIG. 10, the set manger may look at the destination step of the data entry in row 912 of the fourth group 900 in FIG. 9 which is step D. The set manger may then compare the destination step D to source steps of other data entries in the second group 600 of FIG. 6 to determine whether destination step D is equivalent a source step of one of the data entries in the second group. Since the data entry in row 618 has an equivalent source step D to the destination step D, there is a match. The set manager may also compare whether the two data entries in rows 912 and 618 share at least two common test scripts. Since, both data entries are in test script S1, test script S2, and test script S5, the condition may be satisfied.

Since the conditions are satisfied, the set manager may then create a data entry in the fifth group 1000 in FIG. 10.

The data entry may be in row 1012. The data entry in the fifth group in row 1012 may contain the source step of the data entry in row 912 (step A) and the destination step of the data entry in row 618 (step E). This data entry creates a common sequence of steps that is five steps long.

The data entry in row 1014 may be created from rows 914 and 620 because row 914 of the fourth group of steps 900 has an equivalent destination step E to that of the source step E of row 620 in the second group 600 of steps. Since the destination step (step F) of the data entry in row 916 does not match a source step of a data entry in the second group the build of the fifth group is completed.

FIG. 11 illustrates linked sequences of at least six statements that occur over multiple sets, according to various embodiments. FIG. 11 illustrates a sixth group 1100 of steps that have data entries of six sequential steps in two or more scripts. The data entry in row 1112 of the sixth group 1100 may be found similarly to that of the fourth group 900 and fifth group 1000. The set manager may look at the destination steps in the data entries of the previous group (fifth group 1000) and determine whether they are equivalent to the source steps of any of the data entries of the second group 600. The set manager may also determine whether there are two or more common steps shared by the data entries. The data entry in row 1112 may be the source step of the data entry in row 1012 of FIG. 10 (step A) and the destination step of the data entry in row 620 of FIG. 6 (step F) because the data entries in row 1012 and row 620 are linked by step E.

The set manger may then determine whether there is a linked sequence of at least seven statements that occur over multiple sets. The set manager may look at the destination steps in the data entries of the previous group (sixth group 1100) and determine whether any are equivalent to the source steps of any of the data entries of the second group 600. The set manager may also determine whether there are two or more common steps shared by the data entries. The destination step in data entry 1112 is step F. However, there are no source steps in the second group 600 that are step F. Therefore, the set manager may end the method since there are no more ordered statements.

FIG. 12 illustrates a data object 1200 with the smallest common sequence of order statements to the largest common sequence of ordered statements, according to various embodiments. FIG. 12 may illustrate the global list 1200 after all of the groups of varying common sequences of steps are determined. The third group, the fourth group, the fifth group and the sixth group may be added to one data object. Each entry may be represented by a key word. The creation of a data object having the common sequences of steps allows for reusability of common steps when creating test scripts or modifying existing test scripts.

Figure 13:
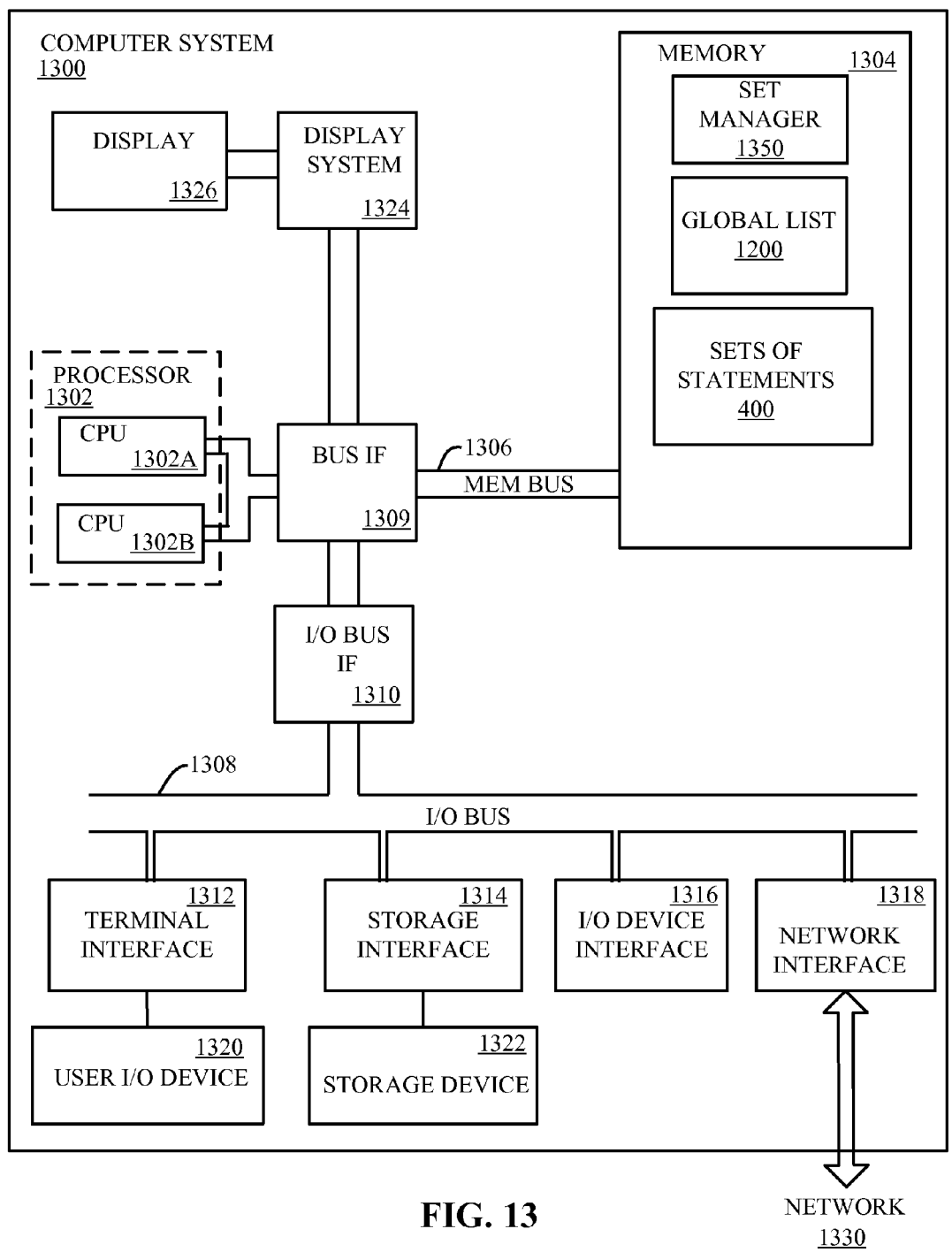
FIG. 13 is intended to depict the representative major components of a computer system, according to various embodiments.

FIG. 13 is a schematic block diagram illustrating one embodiment of a computer system 1300. The computer system 1300 is one exemplary context in which embodiments may be implemented. The mechanisms and apparatus of the various embodiments disclosed herein apply equally to any appropriate computing system. The major components of the computer system 1300 include one or more processors 1302, a memory 1304, a terminal interface 1312, a storage interface 1314, an Input/Output ("I/O") device interface 1316, and a network interface 1318, all of which are communicatively coupled, directly or indirectly, for inter-component communication via a memory bus 1306, an I/O bus 1308, bus interface unit ("IF") 1309, and an I/O bus interface unit 1310.

The computer system 1300 may contain one or more general-purpose programmable central processing units (CPUs) 1302A and 1302B, herein generically referred to as the processor 1302. In an embodiment, the computer system 1300 may contain multiple processors; however, in another embodiment, the computer system 1300 may alternatively be a single CPU system. Each processor 1302 executes instructions stored in the memory 1304 and may include one or more levels of on-board cache.

In an embodiment, the memory 1304 may include a random-access semiconductor memory, storage device, or storage medium (either volatile or non-volatile) for storing or encoding data and programs. In another embodiment, the memory 1304 represents the entire virtual memory of the computer system 1300, and may also include the virtual memory of other computer systems coupled to the computer system 1300 or connected via a network 1330. The memory 1304 is conceptually a single monolithic entity, but in other embodiments the memory 1304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 1304 may store all or a portion of the following: set manager 1350, global list 1200, and sets of statements 400. These programs and data structures are illustrated as being included within the memory 1304 in the computer system 1300, however, in other embodiments, some or all of them may be on different computer systems and may be accessed remotely, e.g., via a network 1330. The computer system 1300 may use virtual addressing mechanisms that allow the programs of the computer system 1300 to behave as if they only have access to a large, single storage entity instead of access to multiple, smaller storage entities. Thus, while the set manager 1350, global list 1200, and sets of statements 400 are illustrated as being included within the memory 1304, these components are not necessarily all completely contained in the same storage device at the same time. Further, although set manager 1350, global list 1200, and sets of statements 400 are illustrated as being separate entities, in other embodiments some of them, portions of some of them, or all of them may be packaged together.

In an embodiment, the set manager 1350, global list 1200, and sets of statements 400 may include instructions or statements that execute on the processor 1302 or instructions or statements that are interpreted by instructions or statements that execute on the processor 1302 to carry out the functions as further described below. In another embodiment, the set manager 1350, global list 1200, and sets of statements 400 may be implemented in hardware via semiconductor devices, chips, logical gates, circuits, circuit cards, and/or other physical hardware devices in lieu of, or in addition to, a processor-based system. In an embodiment, the set manager 1350, global list 1200, and sets of statements 400 may include data in addition to instructions or statements.

The computer system 1300 may include a bus interface unit 1309 to handle communications among the processor 1302, the memory 1304, a display system 1324, and the I/O bus interface unit 1310. The I/O bus interface unit 1310 may be coupled with the I/O bus 1308 for transferring data to and from the various I/O units. The I/O bus interface unit 1310 communicates with multiple I/O interface units 1312, 1314, 1316, and 1318, which are also known as I/O processors (IOPs) or I/O adapters (IOAs), through the I/O bus 1308. The display system 1324 may include a display controller, a display memory, or both. The display controller may provide video, audio, or both types of data to a display device 1326. The display memory may be a dedicated memory for buffering video data. The display system 1324 may be coupled with a display device 1326, such as a standalone display screen, computer monitor, television, or a tablet or handheld device display. In an embodiment, the display device 1326 may include one or more speakers for rendering audio. Alternatively, one or more speakers for rendering audio may be coupled with an I/O interface unit. In alternate embodiments, one or more of the functions provided by the display system 1324 may be on board an integrated circuit that also includes the processor 1302. In addition, one or more of the functions provided by the bus interface unit 1309 may be on board an integrated circuit that also includes the processor 1302.

The I/O interface units support communication with a variety of storage and I/O devices. For example, the terminal interface unit 1312 supports the attachment of one or more user I/O devices 1320, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 1320 and the computer system 1300, and may receive output data via the user output devices. For example, a user interface may be presented via the user I/O device 1320, such as displayed on a display device, played via a speaker, or printed via a printer.

The storage interface 1314 supports the attachment of one or more disk drives or direct access storage devices 1322 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 1322 may be implemented via any type of secondary storage device. The contents of the memory 1304, or any portion thereof, may be stored to and retrieved from the storage device 1322 as needed. The I/O device interface 1316 provides an interface to any of various other I/O devices or devices of other types, such as printers or fax machines. The network interface 1318 provides one or more communication paths from the computer system 1300 to other digital devices and computer systems; these communication paths may include, e.g., one or more networks 1330.

Although the computer system 1300 shown in FIG. 13 illustrates a particular bus structure providing a direct communication path among the processors 1302, the memory 1304, the bus interface 1309, the display system 1324, and the I/O bus interface unit 1310, in alternative embodiments the computer system 1300 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 1310 and the I/O bus 1308 are shown as single respective units, the computer system 1300 may, in fact, contain multiple I/O bus interface units 1310 and/or multiple I/O buses 1308. While multiple I/O interface units are shown, which separate the I/O bus 1308 from various communications paths running to the various I/O devices, in other embodiments, some or all of the I/O devices are connected directly to one or more system I/O buses.

In various embodiments, the computer system 1300 is a multi-user mainframe computer system, a single-user system, or a server computer or similar device that has little or no direct user interface, but receives requests from other computer systems (clients). In other embodiments, the computer system 1300 may be implemented as a desktop computer, portable computer, laptop or notebook computer, tablet computer, pocket computer, telephone, smart phone, or any other suitable type of electronic device.

FIG. 13 is intended to depict the representative major components of the computer system 1300, according to various embodiments. Individual components, however, may have greater complexity than represented in FIG. 13, components other than or in addition to those shown in FIG. 13 may be present, and the number, type, and configuration of such components may vary. Several particular examples of additional complexity or additional variations are disclosed herein; these are by way of example only and are not necessarily the only such variations. The various program components illustrated in FIG. 13 may be implemented, in various embodiments, in a number of different manners, including using various computer applications, routines, components, programs, objects, modules, data structures, etc., which may be referred to herein as "software," "computer programs," or simply "programs."

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used. The computer readable medium may be a computer-readable signal medium or a computer-readable storage medium. The computer readable signal medium or a computer readable storage medium may be a non-transitory medium in an embodiment. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire, optical fiber cable, RF, etc., or any suitable combination of the foregoing.

Computer program code for carrying out operations for aspects may be written in any combination of one or more programming languages, including an object-oriented programming language such as Java, Smalltalk, C++ or the like and conventional procedural programming languages, such as the C programming language or similar programming languages. The program code may execute entirely on the user's computer, partly on the user's computer, as a stand-alone software package, or on one module or on two or more modules of a storage system. The program code may execute partly on a user's computer or one module and partly on a remote computer or another module, or entirely on the remote computer or server or other module. In the latter scenario, the remote computer other module may be connected to the user's computer through any type of network, including a local area network (LAN) or a wide area network (WAN), or the connection may be made to an external computer (for example, through the Internet using an Internet Service Provider).

Aspects are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart, or block diagram block or blocks.

The computer program instructions may also be loaded onto a computer, other programmable data processing apparatus, or other devices to cause a sequence of operational steps to be performed on the computer, other programmable apparatus or other devices to produce a computer-implemented process such that the instructions which execute on the computer or other programmable apparatus provide processes for implementing the functions or acts specified in the flowchart, or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While this disclosure has described the details of various embodiments shown in the drawings, these details are not intended to limit the scope of the invention as claimed in the appended claims.

Pseudo-Code

The following is an example pseudo-code of the operations performed by the set manager according to embodiments.

```
Phase 1: Build the Global list
Converts the individual flat list into a graph/forest and inserts the data into a Global list.
doSanitize: function(statement){ // Strip rich text or any other non-essential information
        return getPlainText(statement);
}
//Build the graph from the list of statements
insertVertex (statement_1, statement_2, script Sr){
        if(statement_1 || statement_2 == KeywordStep){
            return; // another level of sanitization
        }
        a <- doSanitize(statement_1);
        b <- doSanitize(statement_2);
        //table G will have one and only one occurrence of (a, b) where a is the source and b is
    the destination. The No. of scripts & Script Ids will continue to increase based on the occurrence
    or (a,b) in the traversed scripts
        //R is a Row in G
        R<- Select * from G where source == a && destination == b
        If(R == NULL){
            //Step combination was not found, so insert a new row in the table.
            Insert Row R in G WHERE R= (a, b, 2, 1, Sr);
```

```
    }else{
        //R == (a, b, 2, Count, Sr_List);
        R.Count = R.Count + 1;
        R.Sr_List = R.Sr_List.append(Sr);
    }
}
//Build the GlobalList (G)
ManualScript List == MSL
ForEach (MSL){
    ForEach(orderedStatement (a, b) in MSL_i){
        insertVertex (a, b, MSL_i);
    }
}
Phase 2: Traverse the Global List to find ordered sets.
Notation:
    Set(X) -> Set of Rows which have No. Of Steps = X
    R -> is a Row in set S
    R(a->b) -> Row with Source=a and Destination=b
    R(#) -> No. of steps column for Row R
To find the common set of ordered steps with number of steps common being K we will
need
2 sets ie. S(2) and S(K-1)
S(x) == S(2) for the below function
findCommonStepsInTwoSetAndInsertInGlobalList(S(x), S(K-1) ){
    ForEach( Rx(a_x,b_x, count_x, SrNo_x, Sr_List_x) <- S(X) ){
        ForEach( Ry(a_y, b_y, count_y, SrNo_y, Sr_List_y) <- S(K-1) ){ //Where
count_y + 1 = K
            If(b_x == a_y){
                //Source of Rx == Destination of Ry
                //Match found, we need to insert this back into the Global list but
        first find the common set of scripts between the two
                Sr_List (XY) = getCommonScripts(Sr_List_x, Sr_List_y);
                SrNo_xy = Sr_list(XY).size;
                Count_xy = count_y+1; // so for a vertex combination like (a,b) &
    (b,c) the effective link would be a->b->c
                Insert into G <- R(a_x, b_y, K, SrNo_xy, Sr_List_xy);
            }
        }
    }
}
getCommonScripts(Sr_List_x, Sr_list_y){
    //Function to find common elements between these 2 lists
    Return Sr_List_xy;.
}
findCommonSteps(G){
    Int K = 3;
    S(2) <- Set of rows which have R(#)=2
    While (true){
        findCommonStepsInTwoSetAndInsertInGlobalList(S(2), S(K-1))
        Int S(K) <- Select * from G where R(#) == K;
        If(S(K).count == 0)
            Break;//When no rows are found for a given number of steps, stop the
            algo.
        K = K+1;
    }
}
```

What is claimed is:

1. A computer-implemented method for determining a common sequence of ordered statements, comprising:

creating a global list comprising a first set of links generated from a first sequence of statements of a first script, wherein a link in the first set of links indicates an ordered mapping between a source statement and a destination statement selected from the first sequence of statements, and an ordered mapping indicates that a source statement is executed before a destination statement is executed;

adding, to the global list, a second set of links generated from a second sequence of statements of a second script, wherein a link in the second set of links indicates an ordered mapping between a source statement and a destination statement selected from the second sequence of statements;

determining, from the global list, two or more links having equivalent source statements and equivalent destination statements;

adding at least one of the two or more links to a first group of common sequences; and storing the first group of common sequences in a database.

2. The computer-implemented method of claim 1, further comprising:

determining that a first link of the first group of common sequences has a destination statement equivalent to a source statement of a second link of the first group of common sequences;

determining that the first link and the second link were each generated from sequences of statements of two or more common scripts;

generating a third link comprising a source statement of the first link and a destination statement of the second link;

adding the third link to a second group of common sequences; and storing the second group of common sequences in the database.

3. The computer-implemented method of claim 1, wherein source statements and destination statements of one or more links are sequentially disposed between a first source statement of a first link and a first destination statement of the first link.

4. The computer-implemented method of claim 1, further comprising adding source statements and destination statements of one or more links between a first source statement of a first link and a first destination statement of the first link until the first destination statement is not equivalent to a source statement of another link.

5. The computer-implemented method of claim 1, wherein at least one link in the first group of common sequences is assigned a keyword.

6. The computer-implemented method of claim 1, wherein the first script and the second script are test scripts and the first sequence of statements and the second sequence of statements are steps of test scripts.

7. A system for determining a common sequence of ordered statements comprising:
a memory; and
a processor device communicatively coupled to the memory, wherein the memory is encoded with instructions for determining a common sequence of statements from one or more sets of ordered statements, and wherein the processor device is configured to:
create a global list comprising a first set of links generated from a first sequence of statements of a first script, wherein a link in the first set of links indicates an ordered mapping between a source statement and a destination statement selected from the first sequence of statements, and an ordered mapping indicates that a source statement is executed before a destination statement is executed;
add, to the global list, a second set of links generated from a second sequence of statements of a second script, wherein a link in the second set of links indicates an ordered mapping between a source statement and a destination statement selected from the second sequence of statements;
determine, from the global list, two or more links having equivalent source statements and equivalent destination statements;
add at least one of the two or more links to a first group of common sequences; and
store the first group of common sequences in a database.

8. The system of claim 7, wherein the processor device is further configured to:
determine that a first link of the first group of common sequences has a destination statement equivalent to a source statement of a second link of the first group of common sequences;
determine that the first link and the second link were each generated from sequences of statements of two or more common scripts;
generate a third link comprising a source statement of the first link and a destination statement of the second link;
add the third link to a second group of common sequences; and
store the second group of common sequences in the database.

9. The system of claim 7, wherein source statements and destination statements of one or more links are sequentially disposed between a first source statement of a first link and a first destination statement of the first link.

10. The system of claim 7, wherein the processor device is further configured to add source statements and destination statements of one or more links between a first source statement of a first link and a first destination statement of the first link until the first destination statement is not equivalent to a source statement of another link.

11. The system of claim 7, wherein at least one link in the first group of common sequences is assigned a keyword.

12. The system of claim 7, wherein the first script and the second script are test scripts and the first sequence of statements and the second sequence of statements are steps of test scripts.

13. A computer program product for determining a common sequence of ordered statements, the computer program product comprising a computer readable storage medium having program code embodied therewith, the program code executable by a computer to:
create a global list comprising a first set of links generated from a first sequence of statements of a first script, wherein a link in the first set of links indicates an ordered mapping between a source statement and a destination statement selected from the first sequence of statements, and an ordered mapping indicates that a source statement is executed before a destination statement is executed;
add, to the global list, a second set of links generated from a second sequence of statements of a second script, wherein a link in the second set of links indicates an ordered mapping between a source statement and a destination statement selected from the second sequence of statements;
determine, from the global list, two or more links having equivalent source statements and equivalent destination statements;
add at least one of the two or more links to a first group of common sequences; and
store the first group of common sequences in a database.

14. The computer program product of claim 13, wherein the processor device is further configured to:
determine that a first link of the first group of common sequences has a destination statement equivalent to a source statement of a second link of the first group of common sequences;
determine that the first link and the second link were each generated from sequences of statements of two or more common scripts;
generate a third link comprising a source statement of the first link and a destination statement of the second link;
add the third link to a second group of common sequences; and
store the second group of common sequences in the database.

15. The computer program product of claim 13, wherein source statements and destination statements of one or more links are sequentially disposed between a first source statement of a first link and a first destination statement of the first link.

16. The computer program product of claim 13, wherein the program code is further executable by the computer to add source statements and destination statements of one or more links between a first source statement of a first link and a first destination statement of the first link until the first destination statement is not equivalent to a source statement of another link.

17. The computer program product of claim 13, wherein at least one link in the first group of common sequences is assigned a keyword.

\* \* \* \* \*